Patented May 26, 1953

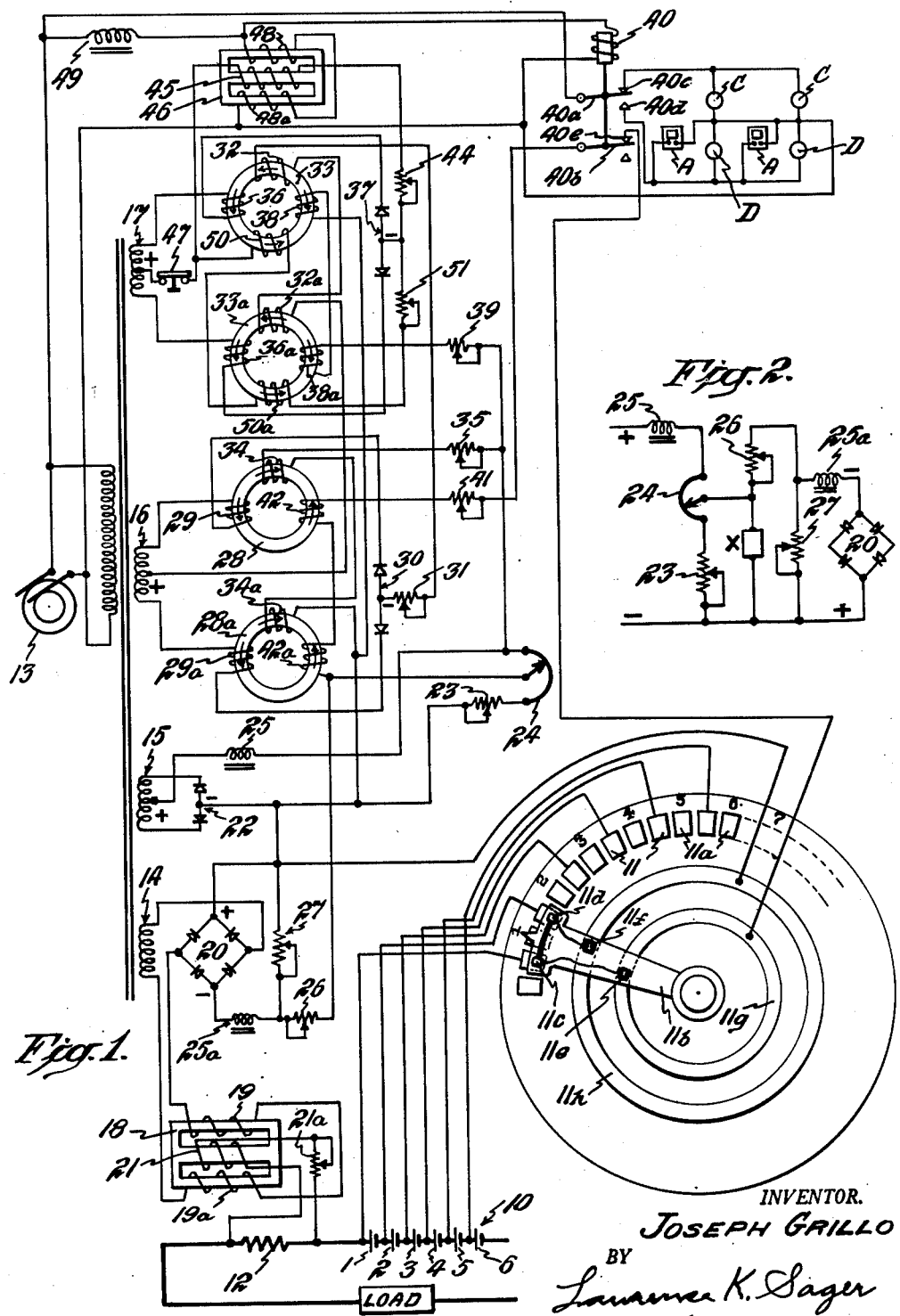

2,640,098

UNITED STATES PATENT OFFICE 2,640,098

ELECTRIC CONTROLLING APPARATUS

Joseph Grillo, New York, N. Y., assignor, by mesne assignments, to Vickers Incorporated, Detroit, Mich., a corporation of Michigan Application May 27, 1948, Serial No. 29,590

8 Claims. (Cl. 175—183)

This invention relates to electric controlling apparatus particularly applicable to determining whether a source of electromotive force is above or below a selected value of electromotive force. It also relates to the convenient and rapid determination of whether any one such source of a series is above or below a selected value of electromotive force. It is particularly applicable to the scanning of the cells of a battery and to varying the selected electromotive force according to the load on the battery. The improvement also has various other applications.

The main object of the invention is to provide a highly sensitive apparatus responsive within close limits to the condition of the cell or other device tested. Another object is to produce apparatus which is unaffected by mechanical shocks or jars. A further object is to insure durability of the parts under long continued use and to avoid the use of parts which are subject to deterioration and to a variable time of usefulness. Another object is to provide convenient adjustment of the electromotive force selected for comparative test purposes. A further object is in the case of a battery of cells, to automatically adjust this selected voltage according to change of load on the battery. Another object is to provide an alarm signal whenever any tested cell or other device is not in accord with the selected requirement and to indicate such cell. Other objects and advantages will be understood from the following description and accompanying drawing.

The application of this invention selected for particular disclosure is to the testing of the electromotive force of the individual cells of a storage battery where the cells are connected in series with each other and the battery supplies a load circuit. In such batteries there is always the danger that one or more cells will gradually decrease their voltage as they approach complete discharge and finally arrive at zero voltage and then reverse their polarity. In such an event the cell may be damaged to the extent that it becomes useless. Therefore it is important to check each cell frequently when under load and detect any individual cell when it has reached a voltage, selected according to the load on the battery, below which it is considered undesirable for the cell voltage to drop. When the voltage of any cell is found to be below the selected value an alarm signal is given and the particular low voltage cell is indicated. It is then necessary to take steps to rectify the condition and avoid the possibility of reversing the cell voltage and of rendering the cell useless.

Fig. 1 is a diagram of a preferred embodiment of the invention; and Fig. 2 is a simplified diagram of a portion of the apparatus for the purpose of explanation.

Referring to Fig. 1, a storage battery 10 having cells numbered 1, 2, 3, etc. is indicated at the lower portion of the figure supplying a load circuit. The cells are respectively connected to a series of contacts 11 between each of which are contacts 11a having no connection thereto. A contact arm 11b is pivotally mounted at the center of this device, termed a scanner, and is rotatable by a central handle or may be driven by a motor continuously in one direction except when mechanically disconnected for permitting manual operation, but as this forms no part of the present invention, such motor drive and disconnection is not shown for simplicity. The arm 11b carries at its outer end a pair of contacts 11c and 11d insulated from each other and which respectively engage the contacts 11 connected across each cell as the arm 11b is turned. The contact 11c is electrically connected to a contact 11e carried by the arm and insulated therefrom. The contact 11d is electrically connected to a contact 11f carried by the arm and insulated therefrom. The contact 11e is in continuous engagement with a fixed circular contact ring 11g; and the contact 11f is in continuous engagement with a fixed contact ring 11h, as the arm is turned. The outer end of the arm is provided with a pointer and the outer portion of the scanner bears numerals 1, 2, 3, etc. corresponding to the same numbers on the cells. The scanner thereby indicates the particular cell which is being tested when the arm is in any position. In the position shown, cell number 1 is being tested; and it is evident that as the arm is turned, the contacts 11c and 11d will successively engage the contact segments to which the individual cells are connected. A shunt 12 is connected in series in the battery load circuit.

A constant voltage source 13 of alternating current is shown at the left of Fig. 1 supplying the primary of a transformer provided with a series of secondary windings 14, 15, 16 and 17.

At the lower left-hand corner of Fig. 1 is shown a reactor having a core 18. This reactor is a compensating reactor for automatically varying the selected voltage against which each cell is tested according to the load on the battery. As the load increases, the normal voltage per cell drops somewhat and consequently the selected test voltage should be lowered as the battery load increases.

The outer legs of the core 18 are provided with windings 19 and 19a connected in series with each other and are supplied with alternating current from the secondary winding 14. The windings 19 and 19a are connected to cause their magnetomotive forces to be in an additive direction to each other in the outside legs of the core. The winding 14 has one terminal connected to a full-wave rectifier 20 shown of the dry disk bridge connected type. The other terminal of winding 14 is connected to winding 19a and then the circuit continues through the winding 19 and then to the other alternating current terminal of the rectifier 20. A winding 21 is on the middle leg of the core 18 and its termianls are connected through a variable resistor 21a to the terminals of the shunt 12. As the current of the battery load circuit increases, the current in the winding 21 increases and increases the magnetization of the core which in turn decreases the reactance of the windings 19 and 19a. This permits increased current to be supplied from the winding 14 to the rectifier 20 and thereby increases the output of this rectifier as the load on the battery increases.

The transformer secondary winding 15 is connected at its outer terminals to a full-wave rectifier 22 indicative of the dry disk type. From the negative mid-connection of this rectifier the circuit extends through an adjustable resistor 23, then through the resistive portion of a rheostat 24 and a choke coil 25 to the mid-connection of the secondary 15 which forms the positive terminal of the circuit. The output circuit of the rectifier 20 follows a path from its negative terminal through a choke coil 25a, an adjustable resistor 26 and then to the movable contact arm of the rheostat 24 and through a resistive portion of the rheostat, and then through the resistor 23 to the positive terminal of the rectifier 20. Another adjustable resistor 27 is connected from the positive terminal of the rectifier 20 to a point between the choke coil 25a and the resistor 26. The choke coils 25 and 25a are for the purpose of reducing the fluxations of the pulsating output current from the rectifiers 20 and 22.

The output circuits just described of these rectifiers are more simply shown in Fig. 2 where the corresponding parts are designated by the same reference characters. The current supplied by the rectifier 22 passes from its positive side downwardly through the rheostat 24 and resistor 23 and imposes a potential difference between the contact arm of the rheostat and the negative line. The positive side of the rectifier 20 is connected to the negative side of the rectifier 22; and the negative side of the rectifier 20 is connected through resistor 26 to the contact arm of the rheostat 24. Thus the electromotive force impressed by the rectifier 20 on that portion of the circuit from the contact arm of rheostat 24 to the lower terminal of resistor 23 is in opposition to that impressed by the rectifier 22 on that portion of the circuit. If these impressed opposed electromotive forces are equal, no current flows in that portion of the circuit. Now assume that a resistive device X is connected in shunt to the above considered portion of the circuit, that is from the arm of the rheostat to the lower terminal of resistor 23. Then under the condition of equal opposed electromotive forces just referred to, no current will pass in the circuit of X. If the electromotive force impressed by the rectifier 20 is increased, current will pass upwardly through 23 and through X; and if decreased below a balanced condition, current will pass downwardly through 23 and X.

Now assume that X instead of being say a resistive device, is a device which itself is a source of electromotive force such as a battery cell, thermocouple, or rectifier. If the negative side of the cell is connected to the lower line of Fig. 2 and the positive side to the contact arm, then the electromotive force of the cell acts in the same direction with the electromotive force of the rectifier 22 and in opposition to the electromotive force of rectifier 20. If the electromotive force of the cell and the resultant electromotive force impressed on its terminals by the rectifiers 22 and 20 are equal, then no current will pass through the cell X. If this resultant electromotive force impressed be now increased, current will pass to the cell, and if it be decreased current will pass from the cell. The circuit containing the cell X is therefore responsive to the relationship between the impressed electromotive forces and may be utilized for securing desired indications of conditions and for controlling effects.

It has already been explained that the greater the load on the battery, the greater will be the output of the rectifier 20. This increases the counter-electromotive forces impressed on the cell X circuit and thereby lowers the electromotive force applied thereto as the battery load increases. It follows that in testing each cell, the greater the battery load, the less will be the selected electromotive force against which it is tested. The resistance of the resistors 23, 26, 27 and of the rheostat 24 are relatively adjusted so that as the battery load increases, the selected electromotive force against which the cell is tested will correspond approximately thereto in reverse relationship. It is apparent that when any cell is tested against any selected electromotive force, current will pass in one direction through the cell circuit if its electromotive force is below the selected electromotive force and in the opposite direction through the cell circuit if its electromotive force is above the selected electromotive force. This direction of current in the cell circuit is utilized for securing an indication of whether or not the electromotive force of the cell is up to the selected reference value. The value of the currents in the circuits considered is quite small and slight changes therein are utilized to give indication of whether or not the voltage of the tested cell is sufficiently high. In the apparatus disclosed, the response may be determined within the limits of .05 of a volt departure in the cell voltage from the selected reference voltage. The slight changes in value of current in the cell circuit and the effect of changes in the direction of current in the cell circuit is detected and amplified by the remaining portions of Fig. 1 not yet described.

Two reactor cores 28 and 28a are shown at the left central portion of Fig. 1. The main exciting windings 29 and 29a are respectively applied thereto and are subjected to half-wave direct currents supplied from the transformer secondary 16. These windings are in turn connected to a full-wave rectifier 30 and from its negative midpoint the circuit continues through an adjustable resistor 31, through windings 32 and 32a on reactor cores 33 and 33a respectively and then to the positive terminal of this circuit at the midpoint of the secondary 16. Windings 34 and 34a are also on the cores 28 and 28a respectively and are supplied with direct current from the rectifier 22 by a circuit from the rectifier through windings 34a and 34 in series with each other, then through the adjustable resistor 35 and through choke coil 25 to the mid-tap of the secondary 15. The magnetomotive force of the windings 34 and 34a is opposite to that of the windings 29 and 29a as indicated by the arrows applied to these windings. The bucking windings 34 and 34a are for the purpose of bringing the magnetization of their cores to the region of low magnetization for yielding a low output at zero control, the resistor 35 being adjusted to the proper amount for that purpose. The reactor cores 33 and 33a are provided with main exciting windings 36 and 36a and are supplied with half-wave direct currents from the secondary winding 17 to the full-wave rectifier 37. The cores 33 and 33a are also supplied with bucking windings 38 and 38a which serve the same purpose as the bucking windings 34 and 34a on the cores 28 and 28a. The arrows on the windings of the cores 33 and 33a indicate the direction of their magnetomotive forces. The bucking windings 38 and 38a are supplied with current derived from the secondary 15 by a circuit from the rectifier 22 through the winding 38 then through winding 38a in series therewith and then through the adjustable resistor 39 and choke coil 25 to the mid-point of the secondary 15.

The circuit of Fig. 1 corresponding to the cell circuit X of Fig. 2 may now be traced. Starting from the positive terminal of rectifier 20 and the negative terminal of rectifier 22, the circuit passes to ring 11h of the scanner, through the arm connection to the negative terminal of cell 1, then from the positive terminal of cell 1 through the arm connection to ring 11g, then through a movable contact 40b of a relay having a winding 40, then through an adjustable resistor 41 and through windings 42 and 42a in series on the cores 28 and 28a to the junction between the contact arm of the rheostat 24 and the resistor 26. When any one of the series of cells is tested, if it is above the selected reference voltage reflected from the battery load, the direction of current in the tested cell circuit will be from the negative terminal of the cell, through the cell to its positive terminal, then through contact 40b, resistor 41, and through windings 42 and 42a in a direction such that their magnetomotive forces buck the magnetomotive forces of the main windings 29 and 29a. This current being in a direction to oppose the magnetomotive force of the main windings causes very little change in the output current from the rectifier 30. In that event no responsive controlling effect results. If however, the voltage of the tested cell is below the particular reference voltage determined by the battery load current, the direction of current in the cell circuit is reversed with the result that the magnetomotive forces of the windings 42 and 42a are then additive to the magnetomotive forces of the windings 29 and 29a. This current being in a saturating direction thereby reduces the reactance of the windings 29 and 29a which results in very considerably increasing the output from the rectifier 30. This increases the current delivered to the windings 32 and 32a on the cores 33 and 33a and as the magnetomotive forces of these windings are additive to that of the main windings 36 and 36a, the current output of the rectifier 37 is greatly increased.

This amplified output from the rectifier 37 is delivered through an adjustable resistor 44 to a winding 45 on the middle leg of a three-legged core 46 from which the circuit returns to the mid-connection of the secondary 17 through a normally closed reset switch 47. On the outside legs of the core 46 are windings 48 and 48a connected in series with each other across the source 13 through an impedance device or choke coil 49. The relay winding 40 is connected in shunt to the windings 48 and 48a. When the increased current in the saturating winding 45 due to a cell having too low a voltage is passed through the winding 45 in the manner just explained, it reduces the reactance of the windings 48 and 48a to such an extent as to lower the voltage applied to the relay winding sufficiently that it can no longer maintain its actuated contacts closed and gives the alarm signal that a poor cell has been detected.

The relay having the winding 40 is shown for simplicity as of the solenoid type but it may be of any suitable form. It has a movable contact 40a and a movable contact 40b already mentioned. When the winding 40 is sufficiently energized the contact 40a engages a fixed contact 40c and when not sufficiently energized it engages a fixed contact 40d. Lamp bulbs C, C are connected to the fixed contact 40c and to one side of the source 13. The movable contact 40a is connected to the other side of the source 13. Thus when the contact 40a engages the fixed contact 40c, the lamps C, C are on giving a clear indication for the battery cell tested. The fixed contact 40d is connected to a pair of lamp bulbs D, D and to a pair of buzzers or audible alarms A, A. The other terminals of the lamps D, D and audible alarms A, A are connected to one side of the source 13. Thus when the relay releases the contact 40a to engage the fixed contact 40d, the danger lamps D, D and the audible alarms receive current from the source 13 to show that the voltage of the cell tested is below the desired value. These signal alarm devices may be distributed at any selected locations and even additional ones used for giving indications at any desired station.

It has already been explained that the movable contact 40b of the relay is in series with the cell circuit when it engages its fixed contact 40e. When a poor cell is detected and the contact 40b released by the relay in the manner already explained, it automatically opens the responsive cell circuit which quickly relieves the cell from continuing to receive the test current in its reverse direction which continuation would be undesirable even though such reverse current is quite small.

However, when the test cell circuit is thus opened and the reverse current no longer passes in the circuit, the detecting and amplifying reactors would then cease to cause the output of the rectifier 37 to be increased and the relay winding 40 would then receive its normal full voltage and reclose its movable contacts to their upper position and if the scanner arm remained in position on the poor cell, the relay would again drop its contacts and result in repeated actuation of its movable contacts back and forth. Such a condition is avoided by adding windings 50 and 50a to the cores 33 and 33a. These windings are supplied with current from the rectifier 37 by a circuit from the rectifier through an adjustable resistor 51, then through the windings 50 and 50a and through reset switch 47 to the mid-connection of the secondary 17. Thus when current is automatically cut off from the test cell circuit, the windings 50 and 50a having magnetomotive forces in the same direction as the main windings 36 and 36a, serve to cause the output of the rectifier 37 to the winding 45 to be sufficient to maintain the voltage applied to the relay winding 40 at a value low enough to be below its pick-up value. Thus when a poor cell is detected, the relay contacts will continue to remain in the position to indicate that a poor cell has been located. It is then necessary to manually reset the relay. This is done by momentarily opening the reset push button switch 47 which opens the circuit of the winding 45 and of the windings 50 and 50a. The relay winding then receives its full voltage and recloses its contacts to the upper position as shown in the drawing and be in condition to again detect a poor cell.

When a poor cell is detected, it is incumbent upon the operator to reduce the load on the battery in order to avoid a further drop in the voltage of the cell and possible reversal of current therein, or bridge the cell by jumpers to thus relieve it from the load current, or to remove the cell and replace it.

When the arm of the scanner is turned around by hand, or continuously driven by a motor and the signals show that a poor cell has been encountered, the reset push button 47 is momentarily opened (and there may be several of these in series with each other at selected locations) and the scanner arm turned back manually to again locate the poor cell by a further detection. The scanner will then indicate by its pointer which cell is poor.

Although the testing of a series of storage battery cells has been particularly described, this improvement is applicable also to the testing of other sources of electromotive force. For example, there may be a series of thermo-couples at various locations where the temperature is required to be maintained above a predetermined value and the couples are used for indicating the temperature at the different locations. This improvement could then be applied for detecting any location where the temperature is below the required value. The invention is likewise applicable to the testing of a series of devices, such as resistors or other impedance devices where a number having the same impedance are grouped in circuits and it is desired to test them for determining if any one has dropped below a required value of impedance. A defective device would then draw a sufficiently large current applied in a saturating direction to the amplifying means to give an indication thereof. Also, instead of being used for scanning a series of devices, the invention, of course, is applicable to the testing of individual units, the relative adjustment of the resistors serving to provide any desired selected test voltage to a high degree of refinement. Although two stages of amplification of the response in the test circuit have been shown in Fig. 1, only one stage may be used, in which case the current from the test circuit would be supplied directly to the windings 32 and 32a on the cores 33 and 33a, the cores 28 and 28a and their windings then being omitted. Instead of using a pair of ring cores for each stage of amplification, they may be of any usual form, or combined into the common form of a three-legged core or of various other arrangements, the form shown being for simplicity of explanation.

Various modifications of this disclosure may be made for adaptation to particular requirements without departing from the scope of the invention.

I claim:

1. Electrical apparatus comprising a source of direct current, a second source of direct current, the output circuits of said sources being connected together at points of unlike polarity, a circuit connected in shunt between the connections of said output circuits, said circuit being adapted to include therein a device to be tested having its own potential difference, electromagnetic means having a winding connected in the circuit of said device for amplifying the value of the current passing in the circuit of said device, and electrical means responsive to said amplified current for indicating when said potential difference is below the electromotive force of one of said output circuits.

2. Electrical apparatus comprising a source of direct current, a second source of direct current, the output circuits of said sources being connected together at points of unlike polarity, a scanner for successively connecting a plurality of devices each having its own potential difference at its terminals in a circuit connected between the connections of said output circuits, electromagnetic amplifying means having a controlling winding connected in the circuit of each of said devices as said devices are successively connected by the scanner, a relay having a winding subjected to current controlled by the output of said amplifying means and energized to hold its movable element in its attracted position when said potential of each of said devices as successively connected by the scanner exceeds the electromotive force of the output circuit of one of said sources and released from its attracted position when said potential of any one of said devices is below the electromotive force of the output circuit of one of said sources, a signal controlled by the movable element of the relay when so released, said amplifying means having an auxiliary winding affecting the current supplied to the relay for reducing the current supplied to the relay winding below its pick-up value after said movable element has moved to its unattracted position even though the scanner be moved to connect other of said devices in circuit, and manual switching means for rendering said auxiliary winding ineffective.

3. Electrical apparatus comprising a direct current source of electromotive force, a second direct current source of electromotive force, the output circuits of said sources being connected together at points of unlike polarity, a scanner for successively connecting in a circuit connected between the output circuits of said sources each cell of a battery having a series of cells for supplying a load circuit, electrical means connected to the load circuit for automatically adjusting the electromotive force of one of said sources according to change in value of the current in the load circuit, electromagnetic amplifying means having a controlling winding in the circuit of each of said cells as each cell is successively connected by said scanner, a relay having a winding affected by the current derived from said amplifying means, and indicating means controlled by said relay for indicating when the electromotive force of each cell as successively connected by the scanner is below the said adjusted electromotive force of one of said sources.

4. Electrical apparatus comprising a source of direct current, a second source of direct current, the output circuits of said sources being connected together at points of unlike polarity, a scanner for successively connecting each cell of a battery in a circuit connected between the connections of said output circuits, electromagnetic amplifying means comprising a reactor core having a main winding supplied with intermittent currents in one direction, said core having a second winding connected in series with each of said cells as each cell is successively connected by said scanner, said second winding having its magnetomotive force additive to the magnetomotive force of said first named winding when the current in the connected cell circuit is in one direction and in opposition when the current in the cell circuit is in the opposite direction, a second reactor having a main winding supplied with alternating current and having a controlling winding connected in the circuit of said main winding on the first named reactor, a relay having a winding connected in parallel with the main winding on said second reactor, an auxiliary winding on the core of said first named reactor supplied with direct current and having its magnetomotive force acting in the same direction as the magnetomotive force of said main winding on said first named reactor, and a switch for rendering said auxiliary winding ineffective.

5. Electrical apparatus comprising a source of direct current, a second source of direct current, the output circuits of said sources being connected together at points of unlike polarity, a circuit connected in shunt between the connections of said output circuits, a scanner for successively connecting in said circuit a plurality of devices to be tested each having its own potential difference, and electromagnetic means having a winding connected in said circuit for amplifying the value of the current passing in the circuit, and electrical means responsive to said amplified current for indicating when the potential difference of any one of said devices is below the electromotive force of one of said output circuits.

6. Electrical apparatus comprising a first source of direct current for supplying a load circuit subject to changing current demand, a second source of direct current, a third source of direct current, the output circuits of said second and third sources being connected together at points of opposite polarity, a shunt circuit connected between the connections of said output circuits, said shunt circuit including therein said first source, means for automatically adjusting the electromotive force of one of said second and third sources in accordance with and in response to the current in said load circuit, and electrical means connected to and responsive to current in said shunt circuit for indicating when the output voltage of the first source is below the output voltage of said one source.

7. An electrical apparatus comprising a first circuit adapted to include therein a device to be tested having its own potential difference for supplying a load circuit subject to changing current demand, a source of direct current connected across said first circuit for applying to said circuit a voltage of given polarity, a second source of direct current connected across said first circuit for applying to said circuit a voltage with a polarity opposite to said given polarity, means for automatically adjusting the voltage applied to said first circuit by one of said sources in response to the current in said load circuit, and means responsive to the current in said first circuit for indicating when said potential difference is below the voltage applied by said one source to said first circuit.

8. Electrical apparatus comprising a source of voltage of a fixed polarity, a second source of voltage of a fixed polarity, the output circuits of said sources being connected together at points of opposite polarity, a scanner for successively connecting in a shunt circuit between the output circuits of said sources each one of a battery of devices for supplying a load circuit subject to changing current demand and each having its own potential difference, means responsive to load current for automatically adjusting the output voltage of one of said sources according to the current in the load circuit, and electrical means connected to and responsive to current in the shunt circuit for indicating when the potential difference of any selected one of said devices is below the output voltage of said one source.

JOSEPH GRILLO.

References Cited in the file of this patent
UNITED STATES PATENTS

| Number | Name | Date |
|---|---|---|
| 2,225,051 | Heyer | Dec. 17, 1940 |
| 2,229,009 | Berry | Jan. 14, 1941 |
| 2,254,846 | Heyer | Sept. 2, 1941 |
| 2,338,423 | Geyger | Jan. 4, 1944 |
| 2,416,949 | Perley et al. | Mar. 4, 1947 |
| 2,540,225 | Wengel et al. | Feb. 6, 1951 |
| 2,547,324 | Hurley | Apr. 3, 1951 |